July 5, 1960 K. C. HUDSON 2,944,199
MEASURING APPARATUS
Filed Dec. 27, 1956

INVENTOR.
KENNETH C. HUDSON
BY Arthur H. Swanson
ATTORNEY.

United States Patent Office 2,944,199
Patented July 5, 1960

2,944,199

MEASURING APPARATUS

Kenneth C. Hudson, Philadelphia, Pa., assignor to Minneapolis-Honeywell Regulator Company, Minneapolis, Minn., a corporation of Delaware Filed Dec. 27, 1956, Ser. No. 630,888

10 Claims. (Cl. 317—246)

This invention relates to measuring apparatus and more specifically to pressure measuring apparatus of the electrical capacitance type.

A general object of this invention is to provide an improved pressure measuring apparatus which will produce an electric effect proportional to the applied pressure.

A more specific object of the present invention is to provide an improved pressure to electric transducer of the capacitance type.

A still more specific object of this invention is to provide an improved pressure to capacitance transducer of increased sensitivity in which the separation of the capacitor plates and the effective area covered by the liquid dielectric between the capacitor plates both vary with the pressure to be measured.

In one form, the present invention comprises an elongated hollow deformable, electrically conductive, elliptical tube as one plate of a capacitor, an elongated elliptical, electrically conductive element mounted coaxially within this tube and separated from the tube as the second plate of the capacitor, and a liquid dielectric partially filling the space between the tube and the element. The pressure to be measured is applied to the external wall of the tube causing the wall of the tube to partially collapse thus varying the capacitor plate separation and also decreasing the internal volume of the tube thus forcing the liquid dielectric to rise in the space between the tube and the element.

In another form of this invention, the elongated, hollow, deformable, electrically conductive, elliptical tube, forming one plate of the capacitor, is mounted coaxially within a hollow, elongated, electrically conductive, elliptical, rigid tube forming the second plate of the capacitor, and the liquid dielectric partially fills the space between the deformable tube and the rigid tube. In this form the pressure to be measured is admitted to the inside of the deformable tube to which it may be suitably piped from a process under measurement. The deformable tube expands on exposure to this internal pressure, thus decreasing the distance between the capacitor plates and increasing the volume of the deformable tube, and forcing the level of the liquid dielectric to rise thereby to increase the effective area of the capacitor plates which is covered.

Both the collapse and expansion of the deformable tube in the apparatus forms illustrated are elastic. On an increase in pressure the capacitance of the capacitor is increased in both forms by two factors: the decrease in capacitor plate separation, and the rise in level of the liquid dielectric. Thus, the change in capacitance for a unit change in pressure is the combined effect of the change in capacitor plate separation and the variation in dielectric level. The result of this combination of effects is a greater change in capacitance per unit change in pressure than has been possible heretofore in devices utilizing the change in capacitor plate separation alone or the variation in level of the liquid dielectric alone. Thus, a more sensitive pressure to capacitor transducer than those presently available is made possible by this invention.

A better understanding of the present invention may be had from the following description read with reference to the accompanying drawings of which:

Figure 1:
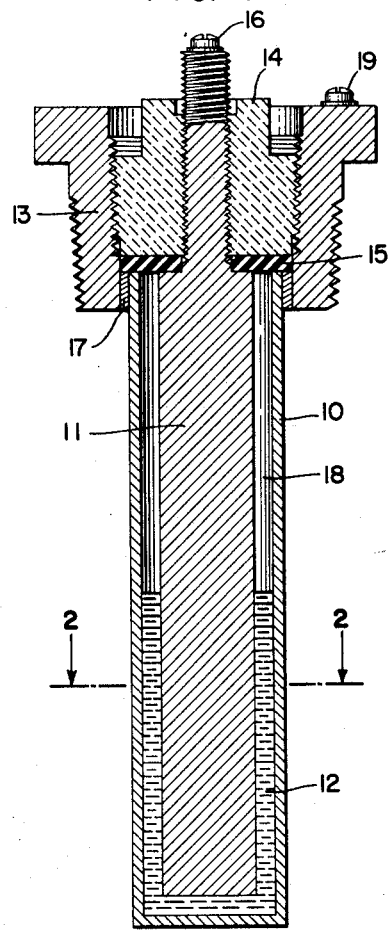
Fig. 1 is a cross sectional view of the present invention in which the pressure to be measured is applied to the external wall of the deformable tube.

Referring to the drawings, Fig. 1 is an embodiment of the pressure to electric transducer of the present invention in which the pressure to be measured is applied to the external wall of the deformable tube.

Figure 2:
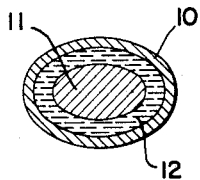
Fig. 2 shows a cross sectional view of the apparatus of Fig. 1 taken along the section lines 2—2.

In Fig. 1 the transducer will be seen to comprise an elongated hollow deformable tube 10, the tube 10 is preferably of an elliptical cross section so as to enhance its ability to partially collapse without destruction when exposed to an external pressure. The cross sectional view shown in Fig. 2 shows one form of the cross section that the tube 10 may assume. It is to be understood, however, that other cross sections of the tube 10 may be utilized so long as the cross section is readily adapted to partially collapse when exposed to the pressure to be measured and yet sufficiently rugged so as to withstand the compressive force of this pressure. The tube 10 is sealed on the lower end in any desired manner. Positioned coaxially within the tube 10 is an elongated rigid element 11 whose lower portion as shown has a similar cross sectional shape as the tube 10. It is understood however that the lower portion of the element 11 may have a cross sectional shape different than that of the tube 10. The upper portion of the element 11 is here shown as circular in cross section and threaded to facilitate mounting the element 11. It will be noted that the tube 10 and the lower portion of the element 11 are separated from each other by a space 18 so that there is no contact between the tube 10 and the element 11. Partially filling the space 18 created by the separation of the tube 10 and the element 11 is a suitable incompressible liquid dielectric 12.

The tube 10 and the element 11 may be constructed of suitable metals or they may be constructed of a non metal coated with a suitable electrically conductive film to enable their use as capacitor plates. The non metal of which the tube 10 is constructed must be deformable under pressure. Such materials as glass or quartz coated with a conductive film of aluminum or silver may be used for the tube 10 as well as the element 11.

The upper end of the tube 10 is fastened to the connecting plug 13 which is threaded on the inside as well as on the outside, with the outside threads being selected for engaging a suitable threaded portion of a chamber where the pressure is to be measured. The tube 10 is fastened to the plug 13 by a filler element 17 which may be welded in position between the plug 13 and the tube 10. The filler element 17 and weld provide an electrically conductive path between the tube 10 and the plug 13. Attached to the top of the plug 13 is a terminal screw 19 for electrical connection to the tube 10 through the plug 13 and the filler element 17.

The element 11 is insulated from the tube 10 and the plug 13 by an insulating gasket 15 and an insulating bushing 14. In addition, the bushing 14 is threaded on the outside and on the inside to thread into the plug 13 and have the upper portion of the element 11 thread into the bushing 14. Thus, the bushing serves to accurately and rigidly position the element 11 within the tube 10. Mounted on top of the element 11 is a terminal screw 16 for electrical connection to the element 11.

The tube 10 and the element 11 each form one plate of a capacitor with the space 18 between the capacitor plates 10 and 11 partially filled with the liquid dielectric 12. The terminals 16 and 19 can be used for connection to suitable capacitance measuring apparatus.

In the operation of the present apparatus, the external wall of the deformable tube 10 is exposed to the pressure to be measured. As this pressure increases it causes the deformable tube 10 to partially collapse an amount proportional to the magnitude of this pressure. In so collapsing, the wall of the tube 10, which forms one plate of a capacitor, is brought closer to the element 11 which forms the other plate of the capacitor. In addition, as a result of the partial collapse of the tube 10, the internal volume of the tube 10 is decreased an amount proportional to the magnitude of the applied pressure and hence the level of the liquid dielectric will rise. There will thus be an increase in capacitance of the capacitor formed by the deformable tube 10 and the element 11, which increase is the result of the decreased capacitor plate separation and the rise in the level of the liquid dielectric 12 between the capacitor plates 10 and 11.

As the pressure applied to the external wall of the tube 10 decreases, the wall of the deformable tube 10 will expand from the former position, thus increasing the capacitor plate separation and increasing the internal volume of the tube 10. The increased volume will cause the level of the liquid dielectric 12 to fall in proportion to the decrease in pressure. There will thus be a decrease in capacitance of the capacitor formed by the deformable tube 10 and the element 11, which decrease is the result of the increase of the capacitor plate separation and the fall in the level of the liquid dielectric 12 between capacitor plates 10 and 11.

Thus the change in capacitance per unit change in pressure is seen to be the combined effect of a change in capacitor plate separation and a change in the level of the liquid dielectric 12 in the space 18 between the capacitor plates 10 and 11 resulting in a greater change in capacitance per unit change in pressure than merely using the change in capacitance caused by the change in the liquid dielectric level alone or the change in capacitance effected as a result of the change in separation of the capacitor plates alone. A pressure responsive capacitor of increased sensitivity is made possible by combining these two effects in the novel manner of this invention.

Figure 3:
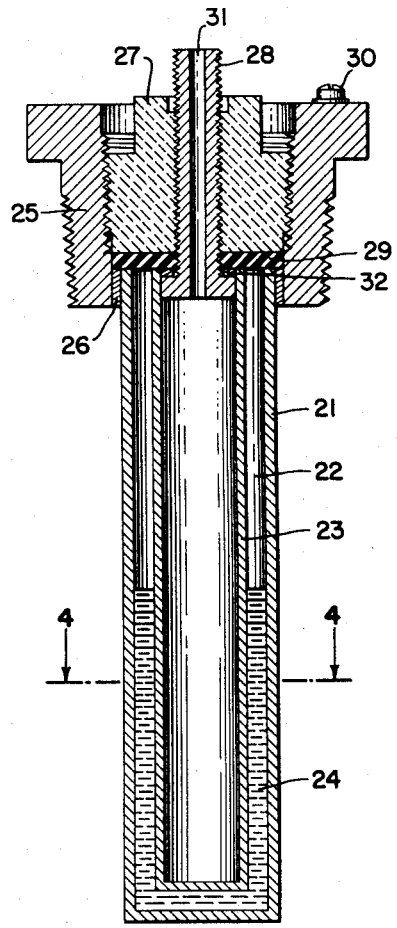
Fig. 3 is a cross sectional view of the present invention in which the pressure to be measured is applied to the internal wall of the deformable tube.

Referring now to Fig. 3, there is illustrated an embodiment of the pressure to electric transducer of the present invention in which the pressure to be measured is applied to the internal wall of the deformable tube and can be utilized in pressure measurements where the pressure to be measured is brought to the transducer by means of tubing.

Figure 4:
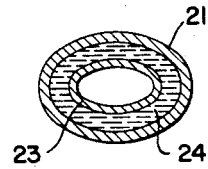
Fig. 4 is a cross sectional view of the apparatus of Fig. 3 taken along the section lines 4—4.

Referring to Fig. 3, the transducer will be seen to comprise an elongated hollow deformable tube 23. The tube 23 is preferably of elliptical cross section to enhance its ability to expand and collapse with variations of internal pressure. The cross sectional view shown in Fig. 4 shows one form that the cross section of the tube 23 may assume. It is to be understood, however, that other cross sections of the tube 23 may be utilized so long as the cross section is readily adapted to elastic expansion when exposed internally to the pressure to be measured. The tube 23 is sealed at the lower end in any desired manner.

The deformable tube 23 is mounted coaxially within an elongated hollow rigid tube 21 which as shown has a cross sectional shape similar to the cross sectional shape of the deformable tube 23. It is understood however that the cross sectional shapes of the deformable tube 23 and the rigid tube 21 need not be similar. The deformable tube 23 and the rigid tube 21 are separated from each other by a space 22. Partially filling this space 22 created by the separation of the deformable tube 23 and the rigid tube 21 is a suitable incompressible liquid dielectric 24.

The deformable tube 23 and the rigid tube 21 may be constructed of suitable metals or they may be constructed of a non-metal coated with a suitable conductive film to enable their use as capacitor plates. The non metal of which the deformable tube 23 is constructed must be deformable under pressure. Such materials as glass or quartz coated with a conductive film of aluminum or silver may be used for the deformable tube 23 as well as the rigid tube 21.

The upper end of the rigid tube 21 is fastened to a connecting plug 25 which is threaded on the inside as well as on the outside, with the outside threads being selected for engaging a suitable threaded portion of appropriate mounting means. The rigid tube 21 is fastened to the plug 25 by a filler element 26 which may be welded in position between the plug 25 and the rigid tube 21. The filler element 26 and weld provide an electrically conductive path between the tube 21 and the plug 25. Attached to the top of plug 25 is a terminal screw 30 for electrical connection to the tube 21 through the plug 25 and the filler element 26.

Attached to the upper end of the deformable tube 23 is a threaded element 28 for mounting the deformable tube 23. The threaded element contains a cylindrical hole 31 for admitting the medium under pressure into the deformable tube. The deformable tube 23 is fastened to the threaded element 28 by a filler element 32 which may be welded in position between the deformable tube 23 and the threaded element 28. The filler element 32 and weld provide an electrically conductive path between the threaded element 28 and the deformable tube 23. An electrical conductor may be connected to the top of the threaded element 28 in any desired manner.

The threaded element 28 and the deformable tube 23 connected to it are insulated from the connecting plug 25 by an insulating gasket 29 and an insulating bushing 27. The insulating bushing 27 is threaded on the outside and on the inside to thread into the connecting plug 25 and to have the threaded element 28 threaded into the bushing 27. The bushing, therefore, serves to accurately and rigidly position the deformable tube 23 within the rigid tube 21 and prevent the deformable tube 23 from coming in contact with the rigid tube 21.

The deformable tube 23 and the rigid tube 21 each form one plate of a capacitor with the space 22 between the capacitor plates 21 and 23 partially filled with the liquid dielectric 24. The terminal 30 and the top of the threaded element 28 may be used for connection to suitable capacitance measuring apparatus.

In the operation of the present apparatus, the internal wall of the deformable tube 23 is exposed to the pressure to be measured which is admitted through the hole 31 of the threaded element 28. As this pressure increases, it causes the wall of the deformable tube 23 to expand an amount proportional to the magnitude of this pressure. In so expanding the wall of the deformable tube 23 which forms one plate of a capacitor is brought closer to the rigid tube 21 which forms the other plate of the capacitor. Also, as the result of an expansion of the deformable tube 23, the volume of the deformable tube increases an amount proportional to the magnitude of the plate pressure thus decreasing the volume of the space 22 between the deformable tube 23 and the rigid tube 21. Because of this decrease in volume of the space 22 between the capacitor plates 21 and 23, the level of the liquid dielectric 24 rises. There will therefore be an increase in capacitance of the capacitor formed by the deformable tube 23 and the rigid tube 21, which increase is the result of the decreased capacitor plate separation and the rise in the level of the liquid dielectric 24 in the space 22 between the capacitor plates 21 and 23.

As the pressure applied to the internal wall of the deformable tube 23 decreases, the deformable tube will partially collapse thus increasing the capacitor plate separation and causing the level of the liquid dielectric 24 to fall. Both of these effects combine to produce a decrease in capacitance as a result of the decrease in pressure.

As is the case in the pressure to capacitance transducer of Fig. 1, the transducer in Fig. 3 causes a change in capacitance for a unit change in pressure which is the combined effect of the variation in capacitor plate separation and the variation in the level of the liquid dielectric contained between the capacitor plates. In both forms of this invention a pressure responsive capacitor with a sensitivity not heretofore available is made possible.

What is claimed is:

1. A pressure to electric transducer comprising an elongated electrically conductive hollow pressure deformable tube adapted for exposure to a pressure to be measured, said deformable tube forming one plate of a capacitor, an elongated electrically conductive rigid element, said element forming a second plate of said capacitor, means for mounting said element and said tube coaxially one within the other and separated from each other by a space, a liquid dielectric partially filling said space between said rigid element and said deformable tube, said liquid dielectric arranged to rise and fall in said space in accordance with volume changes of said deformable tube, and electrical connections to said capacitor for connecting thereto means for measuring changes in the capacitance of said capacitor to obtain an electrical signal proportional to changes in pressure applied to said deformable tube.

2. Apparatus as set forth in claim 1 wherein said deformable tube and said rigid element are metal.

3. Apparatus as set forth in claim 1 wherein said deformable tube is a non metal with an electrically conductive surface coating.

4. Apparatus as set forth in claim 1 wherein said deformable tube is of glass having an aluminum surface coating.

5. Apparatus as set forth in claim 1 wherein said deformable tube and said element member are of non metals with an electrically conductive surface coating.

6. Apparatus as set forth in claim 1 wherein said deformable tube and said rigid element are of elliptical cross section.

7. A pressure to electric transducer comprising an elongated electrically conductive hollow tube adapted to partially collapse on exposure to an external pressure to be measured, said tube forming one plate of a capacitor, an elongated electrically conductive rigid element forming a second plate of said capacitor, means for mounting said element coaxially within said tube and separated therefrom by a space, a liquid dielectric partially filling said space between said element and said tube, and electrical connections to said capacitor for connecting thereto means for measuring changes in the capacitance of said capacitor to obtain an electrical signal proportional to changes in pressure applied to said tube.

8. A pressure to electric transducer comprising an elongated electrically conductive hollow expandable tube adapted for partial expansion on exposure of the inner wall of said expandable tube to a pressure to be measured, said tube forming one plate of a capacitor, an elongated electrically conductive hollow rigid tube, said rigid tube forming a second plate of said capacitor, means for mounting said expandable tube coaxially within said rigid tube and separated therefrom by a space, a liquid dielectric partially filling said space between said expandable tube and said rigid tube, and electrical connections to said capacitor for connecting thereto means for measuring changes in the capacitance of said capacitor to obtain an electrical signal proportional to changes in pressure applied to said expandable tube.

9. A pressure responsive capacitor comprising, in combination, an elongated electrically conductive hollow tube of elliptical cross section forming one plate of said capacitor, an elongated electrically conductive rigid element of elliptical cross section mounted coaxially within said tube and separated therefrom by a space, said element forming a second plate of said capacitor, said tube adapted to partially collapse and vary its internal volume and the separation of said tube and said element on exposure to an external pressure to be measured, a liquid dielectric partially filling said space between said tube and said element, said liquid dielectric arranged to rise and fall in said space in accordance with the internal volume changes of said tube, and electrical connections to said capacitor for connecting thereto means for measuring changes in the capacitance of said capacitor proportional to changes in pressure applied to said tube.

10. A pressure responsive capacitor comprising, in combination, an elongated electrically conductive hollow rigid tube of elliptical cross section forming one plate of said capacitor, an elongated electrically conductive hollow deformable tube of elliptical cross section forming a second plate of said capacitor, a means for mounting said deformable tube coaxially within said rigid tube and separated therefrom by a space, means for exposing the internal wall of said deformable tube to a pressure to be measured, said deformable tube adapted to expand and vary its volume and the separation of said deformable tube and said rigid tube on exposure to said pressure, a liquid dielectric partially filling said space between said deformable tube and said rigid tube, said liquid dielectric arranged to rise and fall with volume changes in said deformable tube, and electrical connections to said capacitor for connecting thereto means for measuring changes in the capacitance of said capacitor proportional to changes in pressure applied to said deformable tube.

References Cited in the file of this patent

UNITED STATES PATENTS

| 1,584,613 | Comstock | May 11, 1926 |
| 1,939,067 | Legg | Dec. 12, 1933 |
| 2,571,507 | Welch | Oct. 16, 1951 |
| 2,699,523 | Meyers | Jan. 11, 1955 |

FOREIGN PATENTS

| 626,217 | Great Britain | July 12, 1949 |
| 957,677 | France | Feb. 22, 1950 |